Jan. 12, 1960     E. D. RANARD     2,920,446
SHOCK POSITIONING MEANS
Filed April 23, 1957
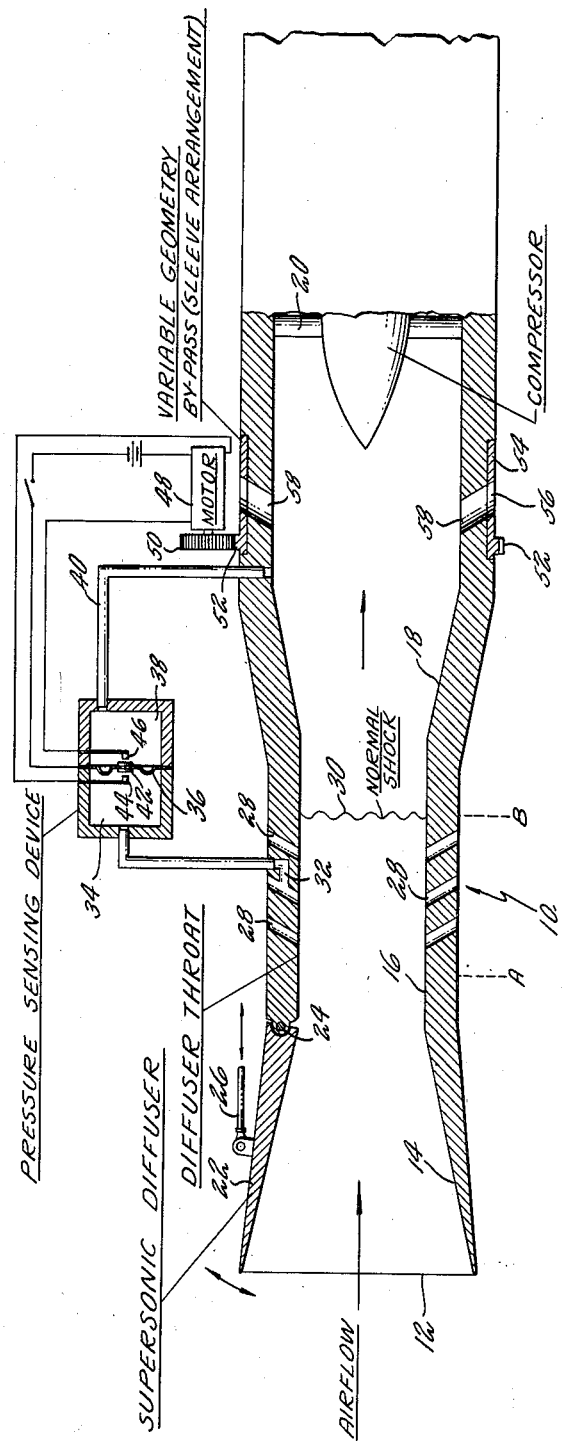
INVENTOR
ELLIOT D. RANARD
BY Leonard F. Weklind
ATTORNEY

United States Patent Office 2,920,446
Patented Jan. 12, 1960

2,920,446

SHOCK POSITIONING MEANS

Elliot D. Ranard, West Hartford, Conn., assignor to United Aircraft Corporation, East Hartford, Conn., a corporation of Delaware Application April 23, 1957, Serial No. 654,591

7 Claims. (Cl. 60—35.6)

This invention relates to supersonic inlets and more particularly to controlled bleed means for inlets for positioning the normal shock therein.

It is an object of this invention to provide a supersonic convergent-divergent inlet having two sets of bleeds therein with means for sensing the flow in one set of bleeds for controlling the area of the other set of bleeds.

A still further object of this invention is to provide a supersonic inlet having bleed passages adjacent the throat region including means for sensing the pressure in these bleeds for varying the opening of another bleed means located downstream thereof.

These and other objects will become readily apparent from the following detailed description of the drawing which illustrates a schematic view in partial cross section of the supersonic inlet of this invention.

Supersonic inlets for turbine power plants or other air breathing power plants usually comprise a convergent-divergent diffuser configuration with a throat or minimum area being located at the intersection of the convergent and divergent sections. In order to obtain the highest pressure recovery and, therefore, the highest amount of energy in the air, it is desired to have the shock swallowed and preferably located adjacent the throat of the diffuser. If the normal shock is not maintained in the region, there may be a tendency under certain conditions to have the shock move forwardly and outwardly of the inlet in the form of a detached shock. Under these conditions the full airstream tube defined by the area at the leading edge of the inlet is not taken into the inlet or diffuser. In other words, a portion of the airstream as it passes through the detached shock will be somewhat deflected so that a portion of this stream tube flows around the outside of the inlet.

Normal shock controls provide variable area or variable geometry inlets and/or a downstream bleed mechanism which can bypass some of the air from inside to outside of the inlet duct before it reaches the power plant. This, it can be said, relieves the back pressure somewhat so that the shock can move into the inlet and be located in the desired position. One way to control the bypasser bleed means is to, for example, locate static pressure taps at, for example, the stations A and B located on the drawing. These pressure taps being spaced along the axis of flow will register different pressures depending on the location of the shock wave. If the shock wave is located between the pressure taps, the pressure on the downstream side of the shock wave will be much greater than that on the upstream side. However, with present day inlet diffusers the normal shock is not clearly defined. In other words, the normal shock is actually spread over a length of the passage and does not assume a clear pattern such as shown in the drawing. Therefore, the ordinary sensing devices are not adequate. It is therefore the purpose of the invention to provide a very accurate and highly efficient control mechanism for controlling the position of a shock wave in a supersonic convergent-divergent diffuser.

As seen in the drawing, an inlet is generally indicated at 10 as having an inlet opening 12, a convergent diffuser portion 14, a throat region 16, and a divergent diffuser portion 18. Air from the divergent diffuser portion 18 is conducted to a power plant which may have a compressor 20 in the case of a turbine-type power plant, or the power plant may be a ramjet or similar air breathing power plant. The convergent portion 14 may include one or more movable wall members 22 which may be pivoted as at 24. A control arm 26 may be provided and this arm may be actuated by any suitable means in the event that the geometry of the inlet is to be varied. It should be noted that this invention is applicable either to variable geometry inlets or fixed geometry inlets.

According to this invention a plurality of peripherally disposed fixed area bleed passages or perforations 28 are located in the throat region 16 of the inlet. If the shock wave 30 is located as shown in the drawing, the flow past the opening of the bleed passages 28 will be supersonic, and it is known that under these conditions the flow through the bleed passages 28 will be somewhat diminished. That means that the pressure in the passages 28 will be relatively low.

However, if the shock 30 moves upstream of the bleed passages 28, the flow past the openings of the passages 28 will be subsonic, thereby increasing the flow through the bleed passages 28 and the pressure therein. Thus, it will be understood that the flow upstream of the shock 30 is always supersonic, while the flow downstream of the normal shock is subsonic. After the flow passes through the properly located shock wave 30 in the throat 16, it is diffused subsonically in the divergent diffuser portion 18. In order to control the position of the shock wave, which as previously stated may be spread over a portion of the axial length of the diffuser throat, it is more accurate to sense the pressure in one or more of the bleed passages 28 than to attempt to locate axially spaced taps in the duct. To get any accurate sensing of the shock position it may ordinarily be necessary to provide a number of pressure pick-ups in the main duct itself and yet a well-defined signal does not always necessarily result. Thus as shown herein, one or more pressure sensing taps 32 are provided which conduct the pressure sensed in the bleed passage to a chamber 34. A diaphragm 36 separates the chamber 34 from a chamber 38 which is fed any suitable datum pressure from a set pressure source or from an inlet pressure which may be sensed by the line 40. The diaphragm 36 carries a contact 42 which may engage either a contact 44 or a contact 46 to actuate the reversible motor 48 in one of two directions. The motor 48 contains a spur gear 50 which engages a ring gear 52 carried by an annular sleeve 54. The sleeve 54 includes a plurality of openings 56 which cooperate with a plurality of passages 58 in the wall of the inlet. The openings 56 are indexed with respect to the passages 58 so that the area of the bleed openings may be varied or adjusted as desired. Thus, by sensing the pressure in the upstream bleeds 28 the motor 48 may be rotated so as to vary the opening or geometry of the downstream bleed passages 58 to relieve the back pressure and to properly locate the normal shock 30 in the throat. It is desired then to prevent the shock from moving upstream into the convergent portion of the diffuser, since if it moves to that region, it will continue to move out into the free stream. In this manner, instantaneous sensing will be provided with very little lag in the system.

It will be apparent that as a result of this invention a highly accurate and sensitive shock locating control has been provided for supersonic inlets having either fixed or variable geometry diffusers. Furthermore, according to this invention, the pressure signal which is utilized to control the main downstream bleed area is more sensitive to the shock position and is repeatable because the profile of the flow in the perforations 28 is more uniform than the profile of the flow in the main passage or throat 16.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. A supersonic inlet for a power plant, said inlet adapted to receive air at supersonic velocities and have a shock located therein, upstream bleed means in the wall of said inlet for bleeding air from inside to outside said inlet, means for sensing the flow in said upstream bleed means to detect whether the shock in the inlet is located upstream or downstream of said upstream bleed means, second downstream means for further bleeding air from said inlet, means for varying the amount of flow through said second bleed means, and means responsive to said flow sensing means for controlling said flow varying means.

2. A supersonic inlet for a power plant, said inlet adapted to receive air at supersonic velocities and having a shock located therein, an air receiving duct forming a part of said inlet, a plurality of upstream bleed passages in said duct for bleeding air from inside to outside said inlet, means for sensing a function of the flow in at least one of said bleed passages to detect whether the shock in the inlet is upstream or downstream of said bleed passages, second means for further bleeding air from said duct at a point downstream of said upstream passages, means for varying the amount of flow through said second bleed means, and means responsive to said flow sensing means for controlling said flow varying means.

3. An inlet for a power plant, said inlet adapted to receive air at supersonic velocities, a supersonic convergent diffuser, a duct receiving air from said diffuser, a plurality of continuously open bleed passages in said duct for bleeding air from inside to outside said inlet, means for sensing the pressure in at least one of said bleed passages, second means downstream of said bleed passages for further bleeding air from said inlet means for varying the amount of flow through said second bleed means, and means responsive to said pressure sensing means for controlling said flow varying means.

4. An inlet for a power plant, said inlet adapted to receive air at supersonic velocities, a supersonic convergent diffuser, a throat receiving air from said diffuser at supersonic velocities and adapted to shock down the flow to subsonic velocities, a plurality of continuously open bleed passages in said throat for bleeding air from inside to outside said inlet, means for sensing the pressure in at least one of said bleed passages to indicate the relative flow therethrough, said pressure sensing means sensing whether the normal shock is upstream or downstream of said bleed passages, means downstream of said bleed passages for further bleeding air from said inlet, means for varying the amount of flow through said bleed means including controllable power source, and means responsive to said pressure sensing means for controlling said power source.

5. An inlet for a power plant, said inlet adapted to receive air at supersonic velocities, a supersonic convergent diffuser, a throat receiving air from said diffuser at supersonic velocities and adapted to shock down the flow to subsonic velocities, a divergent subsonic diffuser downstream of said throat, a plurality of continuously open bleed passages in said throat for bleeding air from inside to outside said inlet, means for sensing the pressure in at least one of said bleed passages to indicate the relative flow therethrough, said pressure sensing means sensing whether the normal shock is upstream or downstream of said bleed passages, means downstream of said bleed passages and located in the region of said divergent diffuser for further bleeding air from said inlet, means for varying the amount of flow through said bleed means including controllable power source, and means responsive to said pressure sensing means for controlling said power source.

6. An inlet for a power plant, said inlet adapted to receive air at supersonic velocities, a supersonic convergent diffuser, a throat receiving air from said diffuser at supersonic velocities and adapted to shock down the flow to subsonic velocities, a divergent subsonic diffuser downstream of said throat, a plurality of continuously open bleed passages peripherally disposed in said throat for bleeding air from inside to outside said inlet, means for sensing the pressure in bleed passages to indicate the relative flow therethrough, said pressure sensing means sensing whether the normal shock is upstream or downstream of said bleed passages, bleed means located in said divergent diffuser for further bleeding air from said diffuser, means for varying the amount of flow through said bleed means including mechanism for varying the open area of said bleed means, said mechanism including a perforated sleeve movable with respect to the wall of said divergent diffuser and cooperating holes in the wall of said divergent diffuser, and means responsive to said pressure sensing means for moving said sleeve.

7. A inlet for a power plant, said inlet adapted to receive air at supersonic velocities, a supersonic convergent diffuser, a throat receiving air from said diffuser at supersonic velocities and adapted to shock down the flow to subsonic velocities, a divergent subsonic diffuser downstream of said throat, a plurality of continuously open bleed passages in said throat for bleeding air from inside to outside said inlet, means for sensing the pressure in at least one of said bleed passages to indicate the relative flow therethrough, said pressure sensing means sensing whether the normal shock is upstream or downstream of said bleed passages, means downstream of said bleed passages and located in the region of said divergent diffuser for further bleeding air from said inlet, means for varying the amount of flow through said bleed means including controllable power source, and means responsive to said pressure sensing means for controlling said power source including a second pressure source and mechanism for comparing the pressure sensed by said sensing means and said second pressure.

References Cited in the file of this patent

UNITED STATES PATENTS

| | | |
|---|---|---|
| 2,732,125 | Ruby | Jan. 24, 1956 |
| 2,873,756 | Pool | Feb. 17, 1959 |

FOREIGN PATENTS

| | | |
|---|---|---|
| 1,075,248 | France | Apr. 14, 1954 |